(12) United States Patent
Mizoguchi et al.

(10) Patent No.: US 12,194,537 B2
(45) Date of Patent: Jan. 14, 2025

(54) ADDITIVE MANUFACTURING DEVICE

(71) Applicant: JTEKT CORPORATION, Osaka (JP)

(72) Inventors: Takashi Mizoguchi, Kariya (JP); Takaya Nagahama, Obu (JP); Koichi Shiiba, Nisshin (JP); Makoto Tano, Obu (JP); Kohei Kato, Nagoya (JP); Sho Hasegawa, Kariya (JP)

(73) Assignee: JTEKT CORPORATION, Kariya (JP)

( * ) Notice: Subject to any disclaimer, the term of this patent is extended or adjusted under 35 U.S.C. 154(b) by 171 days.

(21) Appl. No.: 17/330,992

(22) Filed: May 26, 2021

(65) Prior Publication Data

US 2021/0379668 A1    Dec. 9, 2021

(30) Foreign Application Priority Data

Jun. 4, 2020   (JP) .................. 2020-097440

(51) Int. Cl.
  *B22F 12/41*   (2021.01)
  *B22F 10/85*   (2021.01)
  (Continued)

(52) U.S. Cl.
  CPC .............. *B22F 12/41* (2021.01); *B22F 10/85* (2021.01); *B22F 12/50* (2021.01); *B23K 26/034* (2013.01);
  (Continued)

(58) Field of Classification Search
  CPC ........ B22F 10/25; B22F 10/362; B22F 10/85; B22F 12/17; B22F 12/224; B22F 12/37; B22F 12/41; B22F 12/50; B22F 12/53; B22F 2301/15; B22F 2302/10; B22F 2999/00; B22F 10/28; B22F 10/366;
  (Continued)

(56) References Cited

U.S. PATENT DOCUMENTS

| | | | |
|---|---|---|---|
| 2006/0054079 A1* | 3/2006 | Withey ................. | C22C 19/057 117/108 |
| 2015/0064048 A1* | 3/2015 | Bessac ................... | B22F 10/50 419/29 |

(Continued)

FOREIGN PATENT DOCUMENTS

| | | |
|---|---|---|
| JP | 2015-196265 A | 11/2015 |
| JP | 2016-074956 A | 5/2016 |

(Continued)

OTHER PUBLICATIONS

Japanese Office Action issued in Japanese Patent Application No. 2020-097440 on Mar. 19, 2024, (w/ English translation).

*Primary Examiner* — Dana Ross
*Assistant Examiner* — Adam M Eckardt
(74) *Attorney, Agent, or Firm* — Oblon, McClelland, Maier & Neustadt, L.L.P.

(57) ABSTRACT

There is provided an additive manufacturing device including a control device of controlling a relative posture of a heat retaining light beam irradiation device to a melting light beam irradiation device, in a state where a heat retaining light irradiation range of a heat retaining light beam larger than a melting light irradiation range of a melting light beam is overlapped with the melting light irradiation range, and such that a size of the heat retaining light irradiation range is changeable with respect to a size of the melting light irradiation range.

20 Claims, 6 Drawing Sheets

(51) Int. Cl.
*B22F 12/50* (2021.01)
*B23K 26/03* (2006.01)
*B23K 26/06* (2014.01)
*B23K 26/073* (2006.01)
*B23K 26/08* (2014.01)
*B23K 26/342* (2014.01)
*B33Y 30/00* (2015.01)
*B33Y 50/02* (2015.01)

(52) U.S. Cl.
CPC ...... *B23K 26/0608* (2013.01); *B23K 26/0626* (2013.01); *B23K 26/0732* (2013.01); *B23K 26/0734* (2013.01); *B23K 26/0736* (2013.01); *B23K 26/08* (2013.01); *B23K 26/342* (2015.10); *B33Y 30/00* (2014.12); *B33Y 50/02* (2014.12); *B22F 2301/15* (2013.01); *B22F 2302/10* (2013.01)

(58) Field of Classification Search
CPC .......... B22F 12/44; B22F 12/45; B22F 12/49; B22F 3/008; B22F 3/1055; B33Y 10/00; B33Y 30/00; B33Y 50/02; B23K 26/0006; B23K 26/034; B23K 26/0604; B23K 26/0608; B23K 26/0626; B23K 26/0732; B23K 26/0734; B23K 26/0736; B23K 26/08; B23K 26/144; B23K 26/342; B23K 26/03; B23K 26/06; B23K 26/073; B23K 26/032; B23K 26/0643; B23K 26/0648; B23K 26/082; B23K 26/0821; B23K 26/707; B23K 26/70; C22C 29/067; Y02P 10/25; G05B 19/042; G05B 2219/33198; B28B 1/001; B29C 67/0077; F05D 2230/20; F05D 2230/22; F05D 2230/30; F05D 2230/31; F05D 2230/312; F05D 2230/313; F05D 2230/314

See application file for complete search history.

(56) References Cited

U.S. PATENT DOCUMENTS

| | | | |
|---|---|---|---|
| 2016/0101470 A1 | 4/2016 | Kamakura | |
| 2017/0144248 A1 | 5/2017 | Yoshimura et al. | |
| 2017/0151630 A1* | 6/2017 | Huang | B23K 26/0648 |
| 2017/0225228 A1 | 8/2017 | Nagahama | |
| 2018/0193416 A1 | 4/2018 | Prexler et al. | |
| 2019/0001556 A1 | 1/2019 | Ibe et al. | |
| 2019/0161837 A1 | 5/2019 | Maderud et al. | |
| 2019/0193329 A1* | 6/2019 | Haraguchi | B22F 10/362 |
| 2019/0211424 A1 | 7/2019 | De Flon | |
| 2019/0321917 A1* | 10/2019 | Ku | B23K 26/0876 |
| 2020/0299814 A1 | 9/2020 | Shiratori et al. | |
| 2021/0178485 A1 | 6/2021 | Comu et al. | |
| 2021/0213565 A1* | 7/2021 | Tano | B23K 26/147 |
| 2021/0268586 A1* | 9/2021 | Takeshita | B22F 10/322 |
| 2021/0395860 A1 | 12/2021 | Yamada et al. | |
| 2022/0072619 A1* | 3/2022 | Hirono | B29C 64/393 |
| 2022/0266511 A1 | 8/2022 | Ibe et al. | |
| 2022/0334553 A1* | 10/2022 | Shinozaki | G06N 20/00 |

FOREIGN PATENT DOCUMENTS

| | | |
|---|---|---|
| JP | 2017-114716 A | 6/2017 |
| JP | 2017-141505 A | 8/2017 |
| JP | 2019-507250 T | 3/2019 |
| JP | 2019-513901 T | 5/2019 |
| JP | 2020-079432 A | 5/2020 |
| KR | 10-1787718 B1 | 11/2017 |
| WO | 2019-069701 A1 | 4/2019 |

* cited by examiner

ADDITIVE MANUFACTURING DEVICE

CROSS-REFERENCE TO RELATED APPLICATIONS

This application is based on and claims priority under 35 USC 119 from Japanese Patent Application No. 2020-097440 filed on Jun. 4, 2020, the contents of which are incorporated herein by reference.

TECHNICAL FIELD

The present disclosure relates to an additive manufacturing device.

BACKGROUND ART

It is known that additive manufacturing includes, for example, a directed energy deposition method, a powder bed fusion method, and the like. In the directed energy deposition method, the additive manufacturing is performed by controlling a position of a processing head for performing radiation of a light beam (a laser beam, an electron beam, and the like) and supply of a material. The directed energy deposition method includes laser metal deposition (LMD), direct metal printing (DMP), and the like. In the powder bed fusion method, the additive manufacturing is performed by irradiating a powder material, which is spread flat, with a light beam. The powder bed fusion method includes selective laser melting (SLM), electron beam melting (EBM), and the like.

For example, in the LMD of the directed energy deposition method, a powder material and the like containing a hard material are irradiated with a light beam while being ejected, and thereby the powder material and the like can be solidified after being melted. Accordingly, the LMD is used as, for example, an overlay technique of partially adding an additive manufactured object formed of a hard material to a substrate.

For example, JP2015-196265A discloses an additive manufacturing device including a laminated head that ejects a powder material and irradiates the powder material with a laser beam, and a heating head that heats a molten powder material that is fixed so as to move integrally with the laminated head. In the related-art additive manufacturing device, the heating head suppresses a rapid temperature drop of the molten powder material and forms an atmosphere in which the powder material is easily melted.

In the additive manufacturing, appropriately preheating the substrate and the supplied powder material and retaining the heat of a molten pool formed by melting the powder material are extremely important for an improvement of the quality of the additive manufactured object. In this regard, in the additive manufacturing device disclosed in JP2015-196265A, the heating head moves integrally with the laminated head, that is, the heating head cannot move relative to the laminated head. Therefore, even when the heating head is used, it is extremely difficult to finely adjust the preheating (heating) of the substrate or the powder material that changes every moment, and heat retention of the molten pool.

SUMMARY OF INVENTION

The present disclosure provides an additive manufacturing device capable of easily preheating and retaining heat of a substrate, a powder material and a molten pool, and additively manufacturing a high-quality additive manufactured object.

According to an aspect of the present disclosure, an additive manufacturing device including: a powder material supply device configured to supply a powder material to a substrate, the powder material including a hard material and a cemented carbide binder; a melting light beam irradiation device configured to radiate a melting light beam, the melting light beam heating the powder material supplied to the substrate to a temperature equal to or higher than a melting point of the powder material to melt the powder material; a heat retaining light beam irradiation device configured to radiate a heat retaining light beam, the heat retaining light beam heating the powder material to a temperature lower than the melting point to retain the temperature in an outer side of a melting light irradiation range that is an irradiation range irradiated with the melting light beam; and a control device configured to independently control each of the melting light beam irradiation device and the heat retaining light beam irradiation device, with respect to a irradiation of the melting light beam and the heat retaining light beam, and a relative movement of the melting light beam and the heat retaining light beam to the substrate. The control device is configured to control a relative posture of the heat retaining light beam irradiation device to the melting light beam irradiation device, in a state where a heat retaining light irradiation range is overlapped with the melting light irradiation range, the heat retaining light irradiation range being an irradiation range irradiated with the heat retaining light beam and larger than the melting light irradiation range, and such that a size of the heat retaining light irradiation range is changeable with respect to a size of the melting light irradiation range.

According to the aspect of the present disclosure, the heat retaining light beam irradiation device that radiates the heat retaining light beam can independently change the posture by moving relative to the melting light beam irradiation device that radiates the melting light beam. The size of the heat retaining light irradiation range of the heat retaining light beam can be independently changed without changing the size of the melting light irradiation range of the melting light beam. Therefore, since it is possible to freely change the range heated by the heat retaining light beam, for example, preheating (heating) can be adjusted according to a temperature of the substrate or a temperature of the powder material that changes every moment, or heat retention of the molten pool formed by melting the powder material can be maintained. Therefore, the additive manufacturing device can additively manufacture the high-quality additive manufactured object.

DESCRIPTION OF EMBODIMENTS (1. Overview of Additive Manufacturing Device)

An additive manufacturing device of the present example adopts, for example, an LMD method that is a directed energy deposition method. In the present example, the additive manufacturing device additively manufactures a hard additive manufactured object on a substrate by radiating a light beam while ejecting, to the substrate, a powder material obtained by mixing a bonded powder material with a hard powder material that is a hard material. The powder material, particularly the hard powder material, and the substrate may be formed of different materials, or may be formed of the same material. Further, the powder material may be a granulated powder obtained by solidifying the hard powder material and the bonded powder material.

In the present example, a case where a hard additive manufactured object shaped using a hard powder material of tungsten carbide (WC), which is a hard material, and the like, is additively manufactured on the substrate formed using carbon steel (S45C) will be described. In the present example, cobalt (Co) that acts as a cemented carbide binder for bonding tungsten carbide (WC) to each other is used as the bonded powder material. Here, a melting point (freezing point) of tungsten carbide (WC) is 2870° C., which is higher than a melting point (freezing point) of cobalt (Co) as a cemented carbide binder of 1495° C. In the present example, cobalt (Co) is used as the cemented carbide binder. However, the cemented carbide binder is not limited to cobalt (Co), and, for example, nickel (Ni) can also be used as the cemented carbide binder.

(2. Configuration of Additive Manufacturing Device 100)

Figure 1:
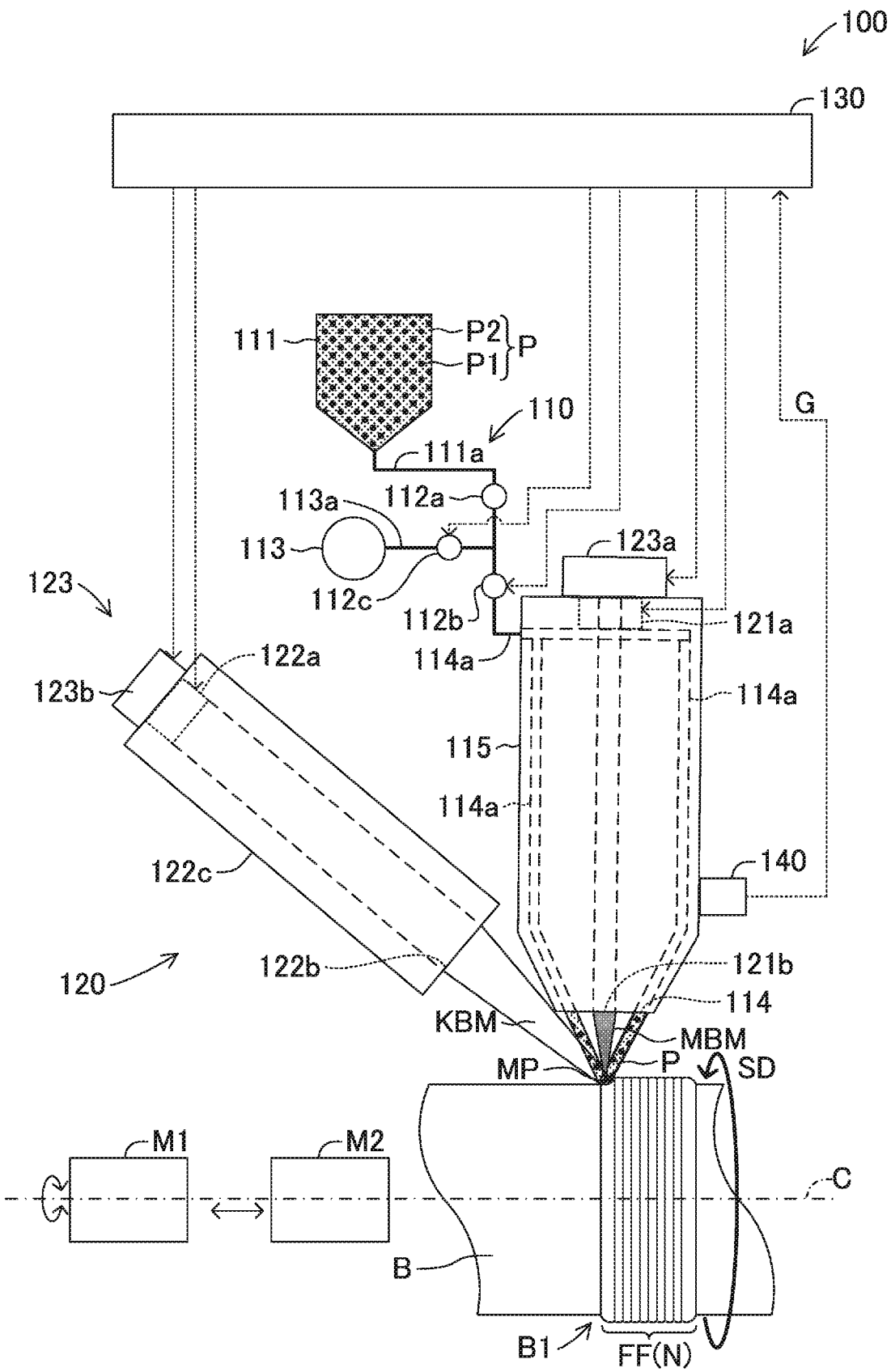
FIG. 1 is a diagram illustrating an additive manufacturing device.

As illustrated in FIG. 1, the additive manufacturing device 100 mainly includes a powder material supply device 110, a light beam irradiation device 120, and a control device 130.

A basic configuration and an operation of the additive manufacturing device 100 of the present example are the same as those of a known LMD type additive manufacturing device. Therefore, a detailed description of the configuration and the operation of the additive manufacturing device 100 will be omitted.

The powder material supply device 110 includes a hopper 111, a valve 112, a gas cylinder 113, and an ejection nozzle 114. The hopper 111 stores a hard powder material P1 mixed with a bonded powder material P2. In the following description, the powder material obtained by mixing the hard powder material P1 and the bonded powder material P2 is referred to as "powder material P".

The valve 112 includes a powder introduction valve 112a, a powder supply valve 112b, and a gas introduction valve 112c. The powder introduction valve 112a is connected to the hopper 111 via a pipe 111a. The powder supply valve 112b is connected to the ejection nozzle 114 via pipes 114a. The gas introduction valve 112c is connected to the gas cylinder 113 via a pipe 113a.

The ejection nozzle 114 and the pipes 114a are accommodated in a tubular container 115 including an inclined portion on an ejection nozzle 114 side. The ejection nozzle 114 is disposed at a tip end of the inclined portion of the container 115. Then, the ejection nozzle 114 ejects the powder material P toward a substrate B, more specifically, a shaping surface B1 for shaping an additive manufactured object FF, by using, for example, high-pressure nitrogen supplied from the gas cylinder 113 via the pipes 114a. The gas for ejecting the powder material P is not limited to the nitrogen, and may be an inert gas such as argon.

Figure 2:
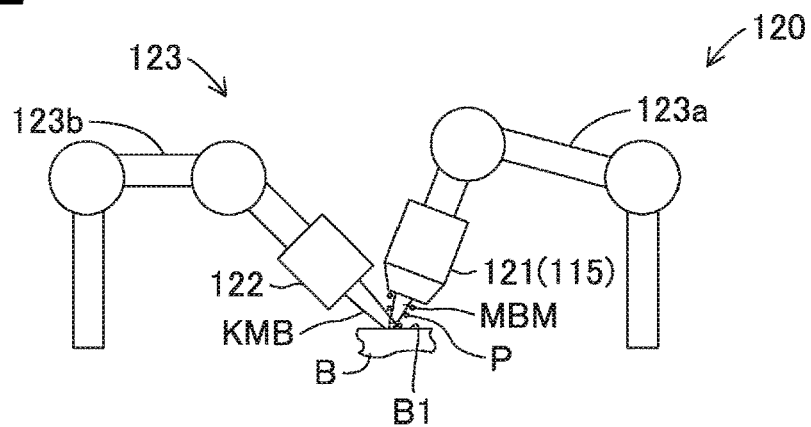
FIG. 2 is a diagram illustrating a moving device of the additive manufacturing device of FIG. 1.
Figure 3:
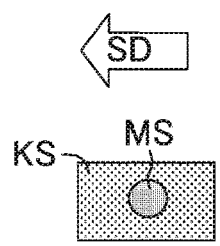
FIG. 3 is a diagram illustrating a melting light irradiation range of a melting light beam and a heat retaining light irradiation range of a heat retaining light beam.

The light beam irradiation device 120 mainly includes a melting light beam irradiation device 121, a heat retaining light beam irradiation device 122, and a moving device 123 that independently moves each of the melting light beam irradiation device 121 and the heat retaining light beam irradiation device 122. Here, as illustrated in FIGS. 1 and 2, the melting light beam irradiation device 121 and the heat retaining light beam irradiation device 122 are disposed such that irradiation directions (optical axis) of the light beams radiated by the moving device 123 intersect or have a twisted positional relationship. That is, as illustrated in FIG. 3, the melting light beam irradiation device 121 and the heat retaining light beam irradiation device 122 are disposed such that an irradiation range of a melting light beam MBM radiated by the melting light beam irradiation device 121 is superimposed on an irradiation range of the heat retaining light beam KBM radiated by the heat retaining light beam irradiation device 122 (overlap).

The melting light beam irradiation device 121 includes a melting light beam irradiation unit 121b that radiates the melting light beam MBM generated and supplied by a melting light beam generation unit 121a so as to be orthogonal to the shaping surface B1 of the substrate B. The melting light beam generation unit 121a is controlled by the control device 130 to generate the melting light beam MBM.

The melting light beam irradiation unit 121b is disposed in the vicinity of the ejection nozzle 114 inside the container 115. Specifically, the melting light beam irradiation portion 121b is disposed at the tip end of the inclined portion of the container 115 such that the melting light beam MBM can be radiated toward a supply position of the powder material P ejected from the ejection nozzle 114.

The melting light beam irradiation portion 121b radiates the melting light beam MBM through an optical system such as a collimator lens or a condenser lens (not illustrated) disposed inside the container 115. Then, as illustrated in FIG. 1, the melting light beam MBM forms a molten pool MP by melting the powder material P supplied from the powder material supply device 110 on the substrate B. The "processing head" includes the ejection nozzle 114, the melting light beam irradiation device 121, and the container 115, and moves integrally with the powder material P and the melting light beam MBM.

The light beam irradiation device 122 includes a heat retaining light beam irradiation unit 122b that irradiates the shaping surface B1 of the substrate B with the heat retaining light beam KBM generated and supplied by a heat retaining light beam generation unit 122a. The heat retaining light beam irradiation device 122 is disposed such that the irradiation direction (optical axis) of the heat retaining light beam has an inclination with respect to the irradiation direction (optical axis) of the melting light beam MBM radiated by the melting light beam irradiation device 121. The heat retaining light beam irradiation device 122 heats and retains heat of the substrate B or the powder material P supplied onto the substrate B in an unmelted state.

The heat retaining light beam generation unit 122a is controlled by the control device 130 to generate the heat retaining light beam KBM. The heat retaining light beam irradiation unit 122b is disposed at a tip end facing the substrate B in the cylindrical container 122c. Specifically, the heat retaining light beam irradiation unit 122b is disposed at the tip end of the container 122c such that the heat retaining light beam KBM can be radiated so as to overlap the irradiation range of the melting light beam MBM radiated from the melting light beam irradiation device 121. The heat retaining light beam irradiation unit 122b is disposed at the tip end of the container 122c such that the heat retaining light beam KBM can be radiated toward a front side and a rear side, in particular, at least toward the rear side in a moving direction of the melting light beam irradiation device 121 with respect to the formed molten pool MP.

The heat retaining light beam irradiation unit 122b radiates the heat retaining light beam KBM through the optical system such as the collimator lens or the condenser lens (not illustrated) disposed inside the container 122c. Then, the heat retaining light beam KBM preheats (heats) the shaping surface B1 of the substrate B and the supplied unmelted powder material P, and retains heat of the molten pool MP formed by the melting light beam MBM.

As illustrated in FIG. 2, the moving device 123 mainly includes a first robot arm 123a and a second robot arm 123b. The first robot arm 123a supports the melting light beam irradiation device 121 (that is, a machining head). The first robot arm 123a relatively displaces the melting light beam irradiation device 121 in a state in which the irradiation direction of the melting light beam MBM (that is, the optical axis of the melting light beam MBM) is orthogonal to the shaping surface B1 of the substrate B.

The second robot arm 123b supports the heat retaining light beam irradiation device 122. Specifically, the second robot arm 123b supports the heat retaining light beam irradiation device 122 in a posture in which the irradiation direction of the heat retaining light beam KBM (the optical axis of the heat retaining light beam KBM) is inclined with respect to the irradiation direction of the melting light beam MBM (the optical axis of the melting light beam MBM), in other words, in a posture in which the irradiation direction of the heat retaining light beam KBM (the optical axis of the heat retaining light beam KBM) is inclined with respect to the shaping surface B1. Then, the second robot arm 123b causes the heat retaining light beam irradiation device 122 to follow the melting light beam irradiation device 121 and relatively displaces the heat retaining light beam irradiation device 122 with respect to the substrate B.

In the present example, as illustrated in FIG. 3, the melting light beam irradiation device 121 radiates the melting light beam MBM having a circular irradiation shape. Further, the heat retaining light beam irradiation device 122 radiates a heat retaining light beam KBM having a quadrangular irradiation shape that is superimposed on the irradiation range of the melting light beam MBM and surrounds an outer side of the irradiation range of the melting light beam MBM. A length (long side or long axis) of the irradiation range of the heat retaining light beam KBM in a moving direction of the heat retaining light beam KBM is set to be 1.5 times or more, preferably 2 times or more, and more preferably 3 times or more, of a length of the irradiation range of the melting light beam MBM in the moving direction of the melting light beam MBM.

Accordingly, the melting light beam MBM mainly melts the powder material P on the shaping surface B1 of the substrate B, thereby additively manufacturing the additive manufactured object FF by a plurality of beads N as illustrated in FIG. 1. The heat retaining light beam KBM mainly preheats the shaping surface B1 of the substrate B. Further, the heat retaining light beam KBM retains heat of the substrate B mainly by suppressing a decrease in a temperature of the additive manufactured object FF (more specifically, the molten pool MP in which the powder material P is melted) additively manufactured on the shaping surface B1 of the substrate B.

In the present example, laser light is used as the melting light beam MBM and the heat retaining light beam KBM. However, the melting light beam MBM and the heat retaining light beam KBM are not limited to the laser light, and, for example, an electron beam may also be used as long as it is an electromagnetic wave. Further, in the present example, the quadrangular heat retaining light beam KBM is radiated so as to be superimposed on the circular melting light beam MBM, but the irradiation shape is not limited thereto.

The control device 130 is a computer device including a CPU, a ROM, a RAM, an interface, and the like as main components. The control device 130 controls powder supply of the powder material supply device 110. Specifically, the control device 130 controls the ejection supply of the powder material P from the ejection nozzle 114 toward the shaping surface B1 of the substrate B by controlling opening and closing of the powder supply valve 112b and the gas introduction valve 112c.

The control device 130 controls light irradiation of the light beam irradiation device 120, that is, the melting light beam irradiation device 121, the heat retaining light beam irradiation device 122, and the moving device 123. Specifically, the control device 130 controls operations of the melting light beam generation unit 121a of the melting light beam irradiation device 121 and the heat retaining light beam generation unit 122a of the heat retaining light beam irradiation device 122. Accordingly, the control device 130 independently controls output conditions of the melting light beam MBM and the heat retaining light beam KBM. Here, examples of the output conditions include a distribution shape of a power density which is a laser output of each of the melting light beam MBM and the heat retaining light beam KBM, or a laser output (W) per unit area of a melting light irradiation range MS which is the irradiation range of the melting light beam MBM and a heat retaining light irradiation range KS which is the irradiation range of the heat retaining light beam KBM as illustrated in FIG. 3, that is, a beam profile.

Figure 4:
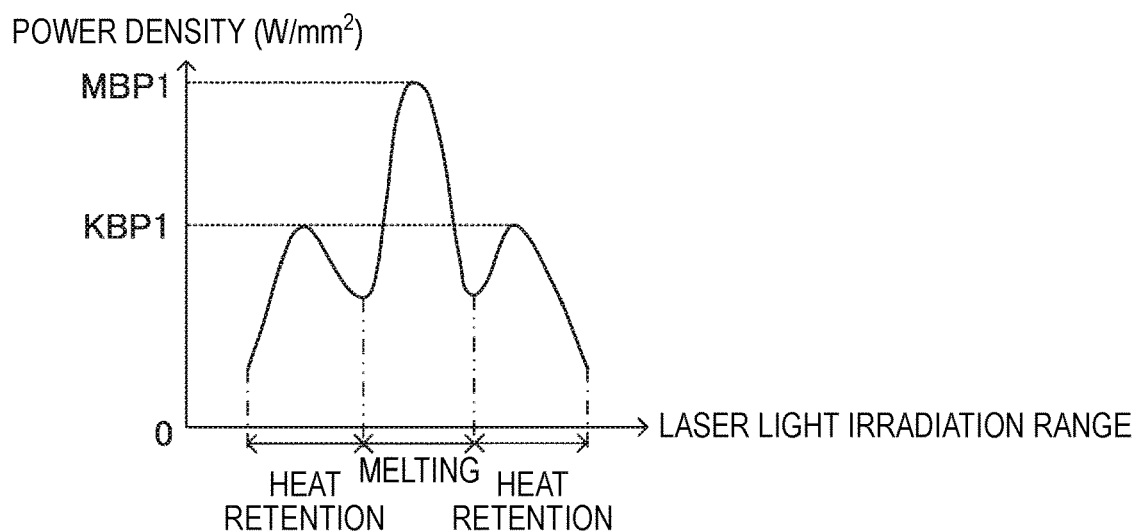
FIG. 4 is a beam profile illustrating a relation between a power density and a light irradiation range in a case of additively manufacturing an additive manufactured object on a substrate in the additive manufacturing device of FIG. 1.

Here, as illustrated in FIG. 4, the control device 130 performs control to increase a peak MBP1 in the beam profile of the power density of the melting light beam MBM from a peak KBP1 in the beam profile of the power density of the heat retaining light beam KBM. The laser output of the melting light beam MBM is controlled such that a temperature, at which the hard powder material P1 and the bonded powder material P2 are melted and the molten pool MP can be formed, is reached. Further, the laser output of the heat retaining light beam KBM is controlled such that a predetermined temperature, at which the hard powder material P1 and the bonded powder material P2 are not melted, is reached.

Further, the control device 130 operates the first robot arm 123a and the second robot arm 123b of the moving device 123 to cause the heat retaining light beam KBM to follow a trajectory of the melting light beam MBM. In this case, the control device 130 can control a size of the irradiation range of the heat retaining light beam KBM, an angle of the optical axis of the heat retaining light beam KBM with respect to the optical axis of the melting light beam MBM, and the like by operating the second robot arm 123b. Accordingly, the control device 130 can control a relative posture of the heat retaining light beam irradiation device 122 with respect to the melting light beam irradiation device 121 such that the size of the irradiation range of the heat retaining light beam KBM (heat retaining light irradiation range) with respect to the size of the irradiation range of the melting light beam MBM (melting light irradiation range) is changeable.

Further, the control device 130 controls relative movement of the melting light beam MBM and the heat retaining light beam KBM with respect to the shaping surface B1 of the substrate B. Specifically, in the present example, the control device 130 controls rotation of a motor M1 to rotate the substrate B around a central axis C, and controls rotation of a motor M2 to move the substrate B in a direction of the central axis C. Accordingly, the relative movement of the melting light beam MBM and the heat retaining light beam KBM with respect to a circumferential surface of the substrate B is controlled.

In the present example, the control device 130 rotates and moves the substrate B. However, it is needless to say that the control device 130 can relatively move the melting light beam irradiation device 121 and the heat retaining light beam irradiation device 122 with respect to the shaping surface B1 of the substrate B by controlling the moving device 123.

Further, the control device 130 is connected to an imaging device 140. The imaging device 140 is assembled to the melting light beam irradiation device 121, and images a state of the additive manufactured object FF (beads N) formed on the shaping surface B1 of the substrate B. The imaging device 140 may be, for example, an infrared camera, an image sensor, and the like.

(3. Outline of Additive Manufacturing Method of Additive Manufactured Product FF)

Next, an additive manufacturing method of the additive manufactured object FF (beads N) will be described. In the additive manufacturing method of the additive manufactured object FF (beads N), as a first stage, preheating processing, which is preprocessing in additive manufacturing processing of the additive manufactured object FF (beads N), is performed by the heat retaining light beam KBM.

Generally, in a state in which the temperature of the shaping surface B1 of the substrate B is low, thermal energy generated by radiation of the melting light beam MBM easily escapes to the substrate B. Accordingly, when the additive manufactured object FF (beads N) is additively manufactured on the shaping surface B1 of the substrate B in a second stage, since occurrence of insufficient melting and the like tend to cause poor melting, the shaping surface B1 of the substrate B is preheated (heated) using the heat retaining light beam KBM in the first stage.

Figure 5:
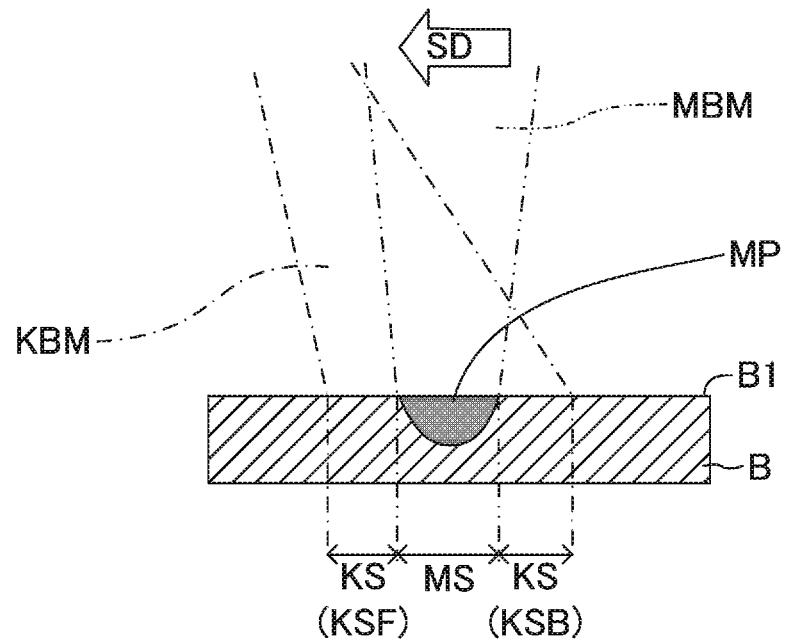
FIG. 5 is a cross-sectional view illustrating an initial state of the additive manufactured object added to the substrate when the additive manufactured object manufactured by the additive manufacturing device of FIG. 1 is additively manufactured.

At this time, the heat retaining light irradiation range KS of the heat retaining light beam KBM in the preheating processing overlaps the melting light irradiation range MS of the melting light beam MBM (intersects the optical axis of the melting light beam MBM) and irradiates a heat retaining light irradiation range KSF in front of the melting light beam MBM in a moving direction SD (see FIG. 5). Further, the laser output of the heat retaining light beam KBM in the preheating processing is controlled such that the shaping surface B1 of the substrate B does not melt and reaches a predetermined temperature.

On the other hand, for example, when the temperature of the shaping surface B1 of the substrate B rises due to the formation of the plurality of beads N and is high, the thermal energy generated by the radiation of the melting light beam MBM tends to be excessive. Accordingly, when the additive manufactured object FF (beads N) is additively manufactured on the shaping surface B1 of the substrate B in the second stage, a bead width of the beads N is widened or a bead height is changed, which tends to cause a failure factor of the additive manufacturing. Therefore, preheating of the shaping surface B1 of the substrate B using the heat retaining light beam KBM in the first stage is suppressed.

At this time, the heat retaining light irradiation range KS of the heat retaining light beam KBM in the preheating processing overlaps the melting light irradiation range MS (intersects the optical axis of the melting light beam MBM). Here, the power density of the heat retaining light beam KBM is smaller than the power density of the melting light beam MBM. Therefore, the influence of the melting light beam MBM on the melting of the powder material P is small.

Figure 6:
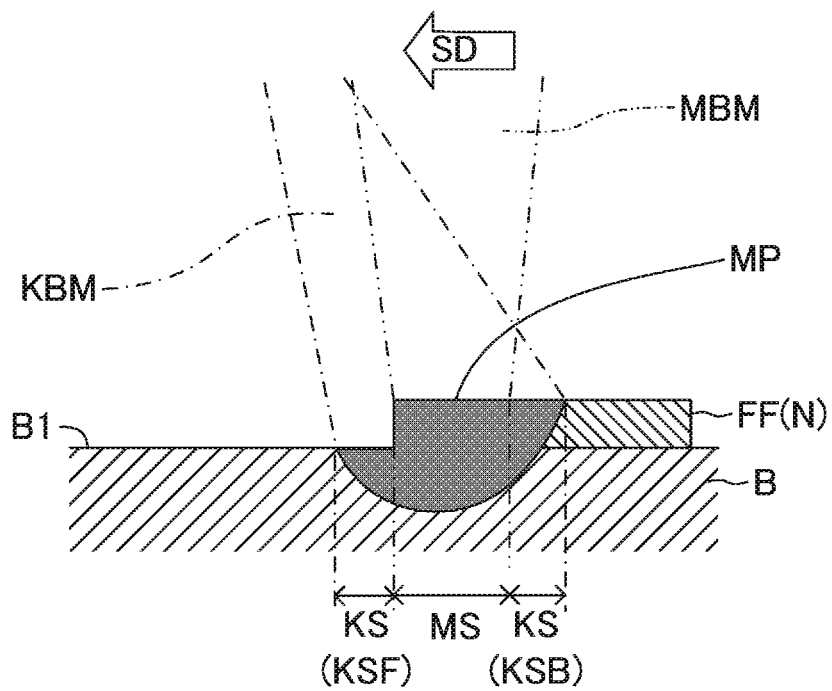
FIG. 6 is a cross-sectional view illustrating an intermediate state and an additional state of the additive manufactured object additively manufactured on the substrate when movement is advanced from the state of FIG. 5.

Next, as the second stage, as illustrated in FIGS. 5 and 6, melting processing of forming the molten pool MP by melting a part of the shaping surface B1 of the substrate B and the powder material P in the melting light irradiation range MS by radiating the melting light beam MBM is performed. In the melting processing, preheating processing is performed as preprocessing of the processing of forming the molten pool MP by a part of the heat retaining light beam KBM in the heat retaining light irradiation range KSF in front of the melting light beam MBM in the moving direction SD of the melting light beam MBM among the heat retaining light irradiation range KS of the heat retaining light beam KBM.

Then, as illustrated in FIG. 6, the molten pool MP is enlarged by performing movement with the melting light beam MBM in the moving direction SD (movement is performed by rotating the substrate B in the present example, but in convenience, it will be described as movement being performed with the melting light beam MBM in FIG. 6), so that the additive manufactured object FF (beads N) is additively manufactured. Here, the additive manufactured object FF (beads N) of the present example is formed by bonding tungsten carbide (WC) of the hard powder material P1 with cobalt (Co) of the bonded powder material P2 acting as a cemented carbide binder. The additive manufactured object FF of the present example is constituted by the plurality of beads N formed in a stripe shape along a circumferential direction of the substrate B (see FIG. 1).

The melting light beam MBM is sequentially moved in the moving direction SD after melting the powder material P2 so as to enlarge the molten pool MP. Therefore, a part of the heat retaining light beam KBM irradiates the molten pool MP in a heat retaining light irradiation range KSB behind the melting light beam MBM in the moving direction SD of the melting light beam MBM among the heat retaining light irradiation range KS of the heat retaining light beam KBM. Accordingly, the heat retaining light beam performs heat retaining processing as post-processing of the additive manufacturing of the additive manufactured object FF.

Incidentally, as described above, when the temperature of the shaping surface B1 of the substrate B is high due to the formation of the plurality of beads N, the thermal energy generated by the radiation of the melting light beam MBM tends to be excessive. In this case, the control device 130 reduces the heat retaining light irradiation range KS. However, in order to continue the heat retaining processing, the control device 130 makes the heat retaining light irradiation range KS of the heat retaining light beam KBM overlap the melting light irradiation range MS (that is, intersects the optical axis of the melting light beam MBM), and irradiates the heat retaining light irradiation range KSB on the rear side with the heat retaining light beam KBM.

Figure 7:
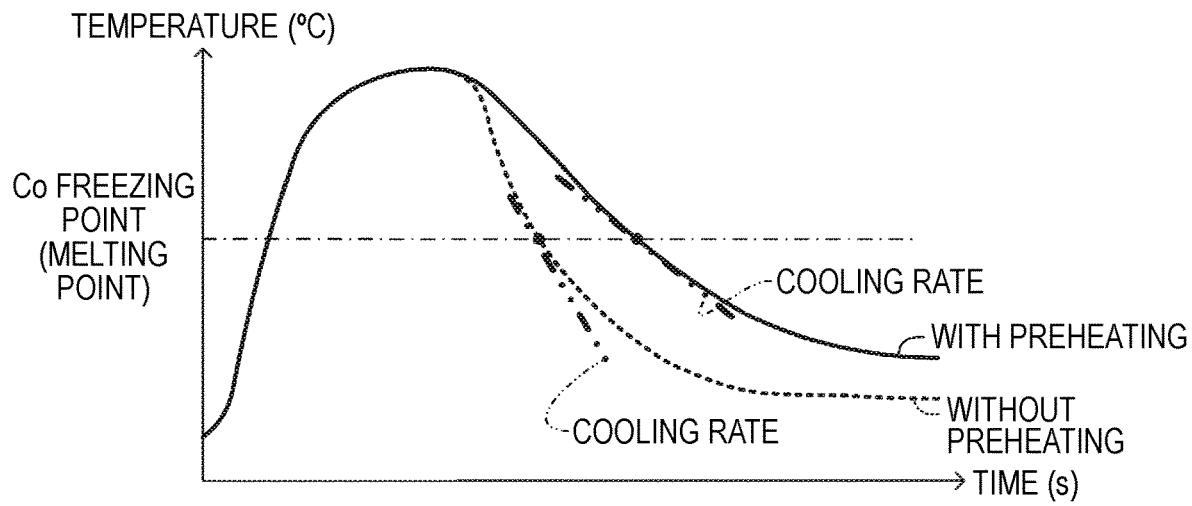
FIG. 7 is a graph illustrating a cooling rate at a freezing point of cobalt (Co), which is a cemented carbide binder.

Here, preheating (and heat retaining) effects will be described. As illustrated in FIG. 7 that is a diagram of change in temperature with time of the additive manufactured object FF, in a case where the preheating of the substrate B is not performed (indicated by a broken line in FIG. 7), the temperature of the additive manufactured object FF decreases rapidly after being heated to exceed the freezing point, that is, the melting point of cobalt (Co). That is, in the case where the preheating is not performed, thermal energy applied in advance is relatively small after the solidification. Therefore, as indicated by a thick two-dot chain line in FIG. 7, a cooling rate (° C./s) at the freezing point of cobalt (Co), which represents temperature drop per unit time, that is, an inclination of a tangent at the freezing point of cobalt (Co) increases, resulting in rapid cooling.

On the other hand, in a case where the substrate B is preheated and the preheating temperature (heating temperature) is 600° C. or higher (indicated by a solid line in FIG. 7), the temperature of the additive manufactured object FF decreases gradually after being heated to exceed the freezing point, that is, the melting point of cobalt (Co). That is, in a case where preheating is performed, the thermal energy applied in advance after the solidification is relatively large. Therefore, as indicated by a thick two-dot chain line in FIG. 7, the cooling rate (° C./s) at the freezing point of cobalt (Co) is smaller than the cooling rate in the case where preheating is not performed.

Therefore, cracking of the additive manufactured object FF can be suppressed by appropriately setting the cooling rate (° C./s) at the freezing point of cobalt (Co) of the bonded powder material P2. Specifically, it has been found that, in a case where the substrate B is preheated (and heat thereof is retained) such that the cooling rate (° C./s) at the freezing point of cobalt (Co) is 540° C./s or less, the rapid cooling of the additive manufactured object FF is prevented, and the cracking of the additive manufactured object FF can be suppressed.

Therefore, the control device 130 sets the beam profile of the power density of the heat retaining light beam KBM such that the cooling rate is 540° C./s or less, and controls the operation of the heat retaining light beam irradiation device 122. Accordingly, in the heat retaining light irradiation range KS irradiated with the heat retaining light beam KBM, the cooling rate of 540° C./s or less is reached, in other words, heat retention is performed at 600° C. or higher, and the rapid cooling is prevented. As a result, the cracking of the additive manufactured object FF can be suppressed.

(4. Details of Additive Manufacturing Method of Additive Manufactured Product FF)

Next, details of an additive manufacturing method of the additive manufactured object FF will be described. The control device 130 starts execution of a control program of the additive manufacturing device illustrated in FIG. 8 in step S10, and controls the operation of the powder material supply device 110 in subsequent step S11. That is, the control device 130 controls opening and closing of the valve 112 of the powder material supply device 110, specifically, the powder supply valve 112b and the gas introduction valve 112c, and supplies a preset supply amount of the powder material P from the ejection nozzle 114 to the substrate B. Then, when the powder material P is supplied to the substrate B, the control device 130 executes processing of step S12.

In step S12, the control device 130 operates the melting light beam irradiation device 121 and the heat retaining light beam irradiation device 122 of the light beam irradiation device 120. Then, the control device 130 irradiates the powder material P supplied to the substrate B in the step S11 with the melting light beam MBM and the heat retaining light beam KBM, and additively manufactures the beads N, that is, the additive manufactured object FF on the shaping surface B1 of the substrate B.

In step S13, the control device 130 acquires image data G of the beads N imaged by the imaging device 140. Then, the control device 130 executes processing of step S14. Incidentally, the control device 130 is not limited to acquiring the image data G that is a still image, and may acquire, for example, moving image data that is a moving image imaged by the imaging device 140.

In step S14, the control device 130 determines whether a bead width W representing a width of the beads N is stable as the formed state of the formed beads N based on the image data G (or moving image data) acquired in step S13. Specifically, when the bead width W is within a range defined by a minimum bead width WL and a maximum bead width WH set in advance, the bead width W is stable. On the other hand, when the bead width W is outside the range defined by the minimum bead width WL and the maximum bead width WH, the bead width W is unstable.

Therefore, when the bead width W is equal to or greater than the minimum bead width WL and less than the maximum bead width WH, the control device 130 determines "Yes" in step S14 and executes processing of step S15. On the other hand, when the bead width W is less than the minimum bead width WL or the bead width W is equal to or greater than the maximum bead width WH, the control device 130 determines "No" in step S14. Then, the control device 130 executes the processing of step S12.

As described above, when the bead width W is equal to or greater than the maximum bead width WH, there is a possibility that the temperature of the substrate B due to the preheating processing rises and the energy when the melting light beam MBM is radiated becomes excessive. That is, when the energy becomes excessive, the molten pool MP becomes larger since the supplied powder material P is excessively melted, and as a result, the bead width W becomes equal to or greater than the maximum bead width WH. On the other hand, when the bead width W is less than the minimum bead width WL, there is a possibility that the temperature of the substrate B due to the preheating processing is low and insufficient melting occurs. That is, when the insufficient melting occurs, the size of the molten pool MP is reduced, and as a result, the bead width W becomes less than the minimum bead width WL.

Therefore, when the processing of step S12 is executed in accordance with the determination processing of "No" in step S14, the control device 130 adjusts an operation content of the light beam irradiation device 120 in accordance with the case where the bead width W is equal to or greater than the maximum bead width WH and the case where the bead width W is less than the minimum bead width WL. This will be described in detail below.

Figure 9:
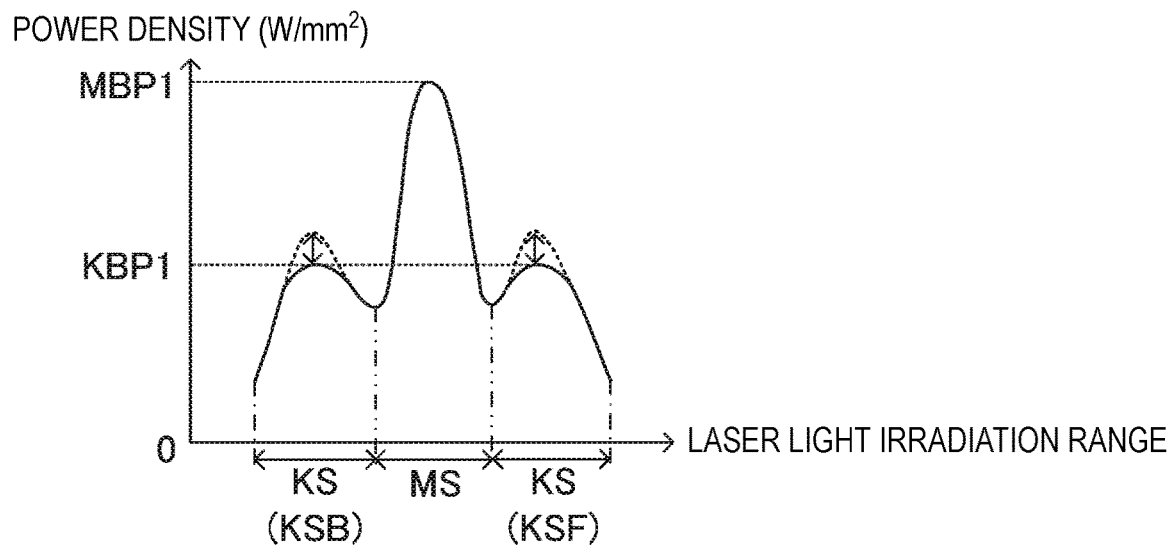
FIG. 9 is a beam profile illustrating a change in the power density of the heat retaining light beam.

When the bead width W is equal to or greater than the maximum bead width WH, as described above, excessive energy generated by the light beam irradiation device 120 is a main cause. Therefore, the control device 130 reduces the power density of the heat retaining light beam KBM in order to reduce the energy generated by preheating the substrate B. Further, the power density of the melting light beam MBM is reduced as necessary in order to reduce the size of the molten pool MP. In this case, as illustrated in FIG. 9, the control device 130 reduces the peak KBP1 in the beam profile of the power density of the heat retaining light beam KBM.

Figure 10:
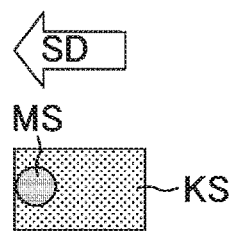
FIG. 10 is a diagram illustrating a change in the heat retaining light irradiation range of the heat retaining light beam when preheating is suppressed.

Alternatively, the control device 130 operates the second robot arm 123b of the moving device 123 in order to reduce the energy generated by preheating the substrate B, thereby reducing the heat retaining light irradiation range KS (making the heat retaining light irradiation range KSF on the front side relatively small), as illustrated in FIG. 10. In this case, the control device 130 operates the second robot arm 123b to reduce an inclination of the optical axis of the heat retaining light beam KBM with respect to the optical axis of the melting light beam MBM (reduces the angle). Accordingly, the heat retaining light irradiation range KS can be reduced.

In this case as well, the control device 130 retains the heat of the molten pool MP by the heat retaining light irradiation range KSB behind the heat retaining light beam KBM. Accordingly, the rapid cooling of the formed molten pool MP is suppressed, and the occurrence of cracking in the formed additive manufactured object FF (beads N) can be prevented.

On the other hand, when the bead width W is less than the minimum bead width WL, as described above, insufficient preheating is a main cause. Therefore, the control device 130 increases the output of the heat retaining light beam KBM in order to increase the energy generated by preheating the substrate B. In this case, as illustrated in FIG. 9, the control device 130 increases the peak KBP1 in the beam profile of the power density of the heat retaining light beam KBM.

Figure 11:
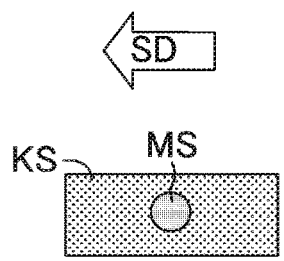
FIG. 11 is a diagram illustrating a change in the heat retaining light irradiation range of the heat retaining light beam when the preheating is strengthened.

Alternatively, the control device 130 operates the second robot arm 123b of the moving device 123 in order to increase the energy generated by preheating the substrate B, thereby enlarging the heat retaining light irradiation range KS (making the heat retaining light irradiation range KSF on the front side relatively large), as illustrated in FIG. 11. In this case, the control device 130 operates the second robot arm 123b to increase the inclination of the optical axis of the heat retaining light beam KBM with respect to the optical axis of the melting light beam MBM (increases the angle). Accordingly, the heat retaining light irradiation range KS can be increased, and the shaping surface B1 of the substrate B can be properly preheated.

Further, in this case, the control device 130 operates the second robotic arm 123b to relatively move the heat retaining light beam irradiation device 122 in a direction away from the substrate B, and increase the output of the heat retaining light beam KBM. Accordingly, the heat retaining light irradiation range KS is increased in accordance with the relative movement of the heat retaining light beam irradiation device 122 in the direction away from the substrate B. When the heat retaining light irradiation range KS is increased, the power density is relatively decreased, and thus the output of the heat retaining light beam KBM is increased. Accordingly, the heat retaining light irradiation range KSF on the front side can be made relatively large, and the substrate B can be properly preheated by the heat retaining light beam KBM in the heat retaining light irradiation range KSF.

In this case as well, the control device 130 retains the heat of the molten pool MP by the heat retaining light irradiation range KSB behind the heat retaining light beam KBM. Accordingly, the rapid cooling of the formed molten pool MP is suppressed, and the occurrence of cracking in the formed additive manufactured object FF (beads N) can be prevented.

When the control device 130 adjusts the operation contents of the light beam irradiation device 120 and the moving device 123 according to the bead width W, the control device 130 operates the light beam irradiation device 120 according to the adjusted operation content. Then, processing of steps after step S13 is executed again.

Figure 8:
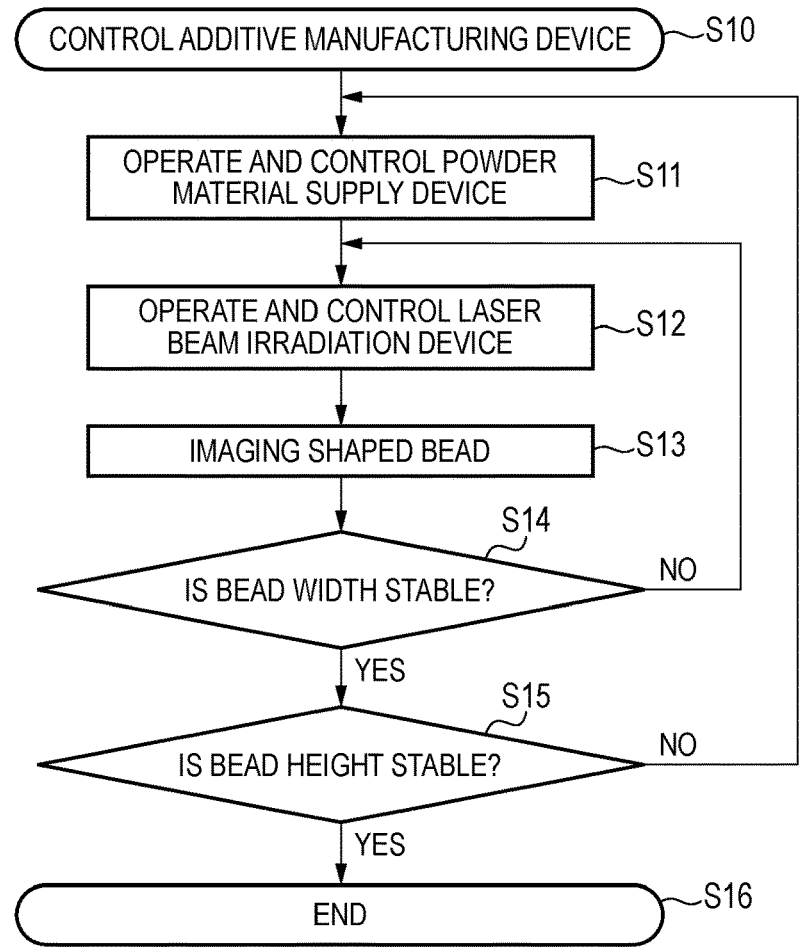
FIG. 8 is a flowchart of a control program of the additive manufacturing device.

On the other hand, if "Yes" is determined in step S14 illustrated in FIG. 8, the control device 130 executes the processing of step S15. That is, in step S15, the control device 130 determines whether a bead height H representing a height of the beads N is stable as the formed state of the formed beads N based on the image data G (or moving image data) acquired in step S13. Specifically, when the bead height H is within a range defined by a minimum bead height HL and a maximum bead height HH set in advance, the bead height H is stable. On the other hand, when the bead height H is outside the range defined by the minimum bead height HL and the maximum bead height HH, the bead height H is unstable.

Therefore, when the bead height H is equal to or greater than the minimum bead height HL and less than the maximum bead height HH, "Yes" is determined in step S15, the control device 130 continues the formation of the beads N, that is, the additive manufactured object FF, and ends the execution of the program in step S16 when the formation of the additive manufactured object FF is completed. On the other hand, when the bead height H is less than the minimum bead height HL or the bead height H is equal to or greater than the maximum bead width WH, the control device 130 determines "No" in step S15. Then, the control device 130 executes the processing of step S11.

When the bead height H is equal to or greater than the maximum bead height HH, there is a possibility that the supply amount of the powder material P supplied to the substrate B becomes excessive. That is, when the supply amount of the powder material P is excessive and the supplied powder material P is melted, the bead height H becomes equal to or greater than the maximum bead height HH. On the other hand, when the bead height H is less than the minimum bead height HL, there is a possibility that the supply amount of the powder material P supplied to the substrate B becomes excessively small. That is, even when the supply amount of the powder material P is excessively small and all the supplied powder material P is melted, the bead height H becomes less than the minimum bead height HL.

Therefore, when the processing of step S11 is executed in accordance with the determination processing "No" in step S15, the control device 130 adjusts the supply amount of the powder material P supplied from the powder material supply device 110 in accordance with the case where the bead height H is equal to or greater than the maximum bead height HH and the case where the bead height H is less than the minimum bead height HL. This will be described in detail below.

When the bead height H is equal to or greater than the maximum bead height HH, as described above, the excessive supply amount of the powder material P supplied from the powder material supply device 110 is a main cause. Therefore, the control device 130 decreases the supply amount of the powder material P supplied to the substrate B. That is, the control device 130 reduces an opening degree of the valve 112 of the powder material supply device 110, specifically, opening degrees of the powder supply valve 112b and the gas introduction valve 112c. In this case, the control device 130 can increase a moving speed of the machining head without changing the supply amount of the powder material P such that the supply amount of the beads N per unit length is reduced.

When the bead height H is less than the minimum bead height HL, as described above, the insufficient supply amount of the powder material P supplied from the powder material supply device 110 is a main cause. Therefore, the control device 130 increases the supply amount of the powder material P supplied to the substrate B. That is, the control device 130 increases the opening degree of the valve 112 of the powder material supply device 110, specifically, the opening degrees of the powder supply valve 112b and the gas introduction valve 112c. In this case, the control device 130 can decrease a moving speed of the machining head without changing the supply amount of the powder material P such that the supply amount of the beads N per unit length is increased.

When the operation content of the powder material supply device 110 is adjusted in accordance with the bead height H, the control device 130 operates the powder material supply device 110, specifically, the valve 112 in accordance with the adjusted operation content. Then, the processing of steps after step S12 is executed again.

As can be understood from the above description, according to the additive manufacturing device 100, the heat retaining light beam irradiation device 122 that radiates the heat retaining light beam KBM can independently change the posture by moving relative to the melting light beam irradiation device 121 that radiates the melting light beam MBM. Accordingly, the size of the heat retaining light irradiation range KS of the heat retaining light beam KBM can be independently changed without changing the size of the melting light irradiation range MS of the melting light beam MBM. Therefore, since it is possible to freely change the range heated by the heat retaining light beam KBM, for example, preheating (heating) can be adjusted according to the temperature of the shaping surface B1 of the substrate B that changes every moment, or heat retention of the molten pool MP formed by melting the powder material P can be adjusted. Therefore, the additive manufacturing device 100 can additively manufacture the high-quality additive manufactured object FF.

(5. Others)

Figure 12:
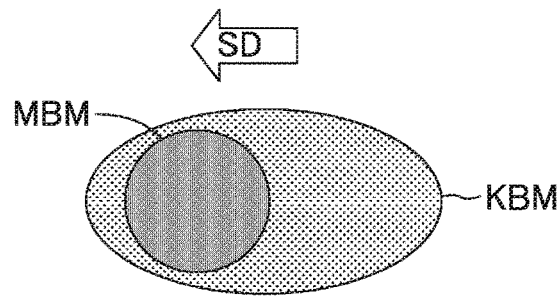
FIG. 12 is a diagram illustrating a modification of an irradiation shape of the heat retaining light beam.
Figure 13:
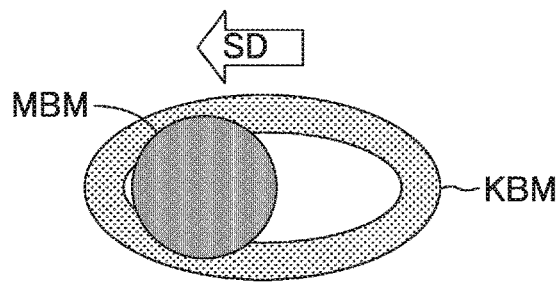
FIG. 13 is a diagram illustrating a modification of the irradiation shape of the heat retaining light beam.
Figure 14:
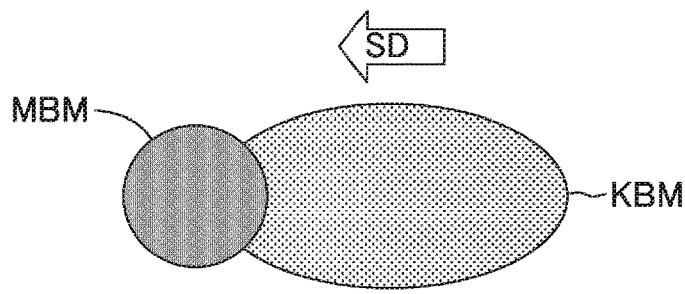
FIG. 14 is a diagram illustrating superimposition of the melting light irradiation range and the heat retaining light irradiation range.
Figure 15:
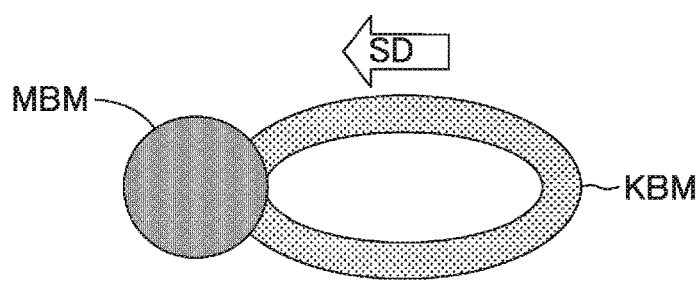
FIG. 15 is a diagram illustrating superimposition of the melting light irradiation range and the heat retaining light irradiation range.

In the present example described above, the irradiation shape of the melting light beam MBM is a circular shape. However, the irradiation shape of the melting light beam MBM may be, for example, a polygonal shape. Further, in the present example described above, the irradiation shape of the heat retaining light beam KBM is a quadrangular shape. However, the irradiation shape of the heat retaining light beam KBM may be, for example, an elliptical shape (circular shape) illustrated in FIG. 12, an annular shape (or a quadrangular annular shape and the like) so as to include the melting light beam MBM as illustrated in FIG. 13, or a polygonal shape other than a rectangular shape. Further, as illustrated in FIGS. 14 and 15, the melting light beam MBM and the heat retaining light beam KBM may overlap at least partially. Also in these cases, similar effects as those of the present example described above can be expected.

In the present example described above, the powder material P formed of the hard powder material P1 and the bonded powder material P2 is ejected and supplied to the shaping surface B1 of the substrate B by the powder material supply device 110 in the additive manufacturing device 100. However, regarding material supply to the shaping surface B1, the material is not limited to the powder material P, and for example, a wire or the like, which is formed of linear materials made of metal, may also be supplied by a material supply device. In this case, the supplied linear material is melted by the melting light beam MBM radiated from the light beam irradiation device 120 and the heat thereof is retained by the heat retaining light beam KBM, so that the additive manufactured object FF can be additively manufactured on the shaping surface B1 of the substrate B. Therefore, similar effects as those of the present example can be expected.

The present example or the like described above has described a case where the additive manufacturing device 100 adopts the LMD method. Instead, even when the additive manufacturing device adopts an SLM method, the heat retaining light beam can retain the heat of the molten pool (additive manufactured object). However, in a case where the SLM is adopted, a moving speed of a light beam is generally higher than a moving speed of a light beam in the LMD. Therefore, in a case where the additive manufacturing device adopts the SLM, a moving speed of the melting light beam and a moving speed of the heat retaining light beam are preferably lower than, for example, those during general additive manufacturing. As the moving speed is decreased, heat retaining effects of the heat retaining light beam KMB are more exhibited.

What is claimed is:

1. An additive manufacturing device comprising:
a powder material supply device including an ejection nozzle to supply a powder material from the ejection nozzle to a substrate, the powder material including a hard material and a cemented carbide binder;
a melting light beam irradiation device including a melting light beam generator to radiate a melting light beam from the melting light beam generator, the melting light beam heating the powder material supplied to the substrate to a temperature equal to or higher than a melting point of the powder material to melt the powder material;
a heat retaining light beam irradiation device including a heat retaining light beam generator to radiate a heat retaining light beam from the heat retaining light beam generator, the heat retaining light beam heating the powder material to a temperature lower than the melting point to retain the temperature in an outer side of a melting light irradiation range that is an irradiation range irradiated with the melting light beam;

a first motor configured to rotate so as to rotate a substrate around a horizontal central axis, and a second motor configured to rotate so as to move the substrate in a direction of the horizontal central axis; and a controller configured to independently control each of the melting light beam irradiation device and the heat retaining light beam irradiation device, with respect to a irradiation of the melting light beam and the heat retaining light beam, and a relative movement of the melting light beam and the heat retaining light beam to the substrate, wherein the controller is configured to control a relative posture of the heat retaining light beam irradiation device to the melting light beam irradiation device, in a state where a heat retaining light irradiation range is overlapped with the melting light irradiation range, and wherein the controller is configured to control rotation of the first motor and rotation of the second motor so as to control relative movement of the melting light beam and heat retaining light beam with respect to a circumferential surface of the substrate.

2. The additive manufacturing device according to claim 1, wherein the controller is configured to control the posture of the heat retaining light beam irradiation device, in a state in which an irradiation direction of the heat retaining light beam is inclined with respect to an irradiation direction of the melting light beam.

3. The additive manufacturing device according to claim 1, wherein an irradiation direction of the melting light beam is a direction perpendicular to a shaping surface of the substrate on which an additive manufactured object is shaped.

4. The additive manufacturing device according to claim 1, wherein the heat retaining light irradiation range includes a quadrangular shape having a long side along a moving direction of the heat retaining light beam.

5. The additive manufacturing device according to claim 1, wherein the heat retaining light irradiation range includes an elliptical shape having a long axis along a moving direction of the heat retaining light beam.

6. The additive manufacturing device according to claim 1, wherein the heat retaining light irradiation range is an annular shape that accommodates the melting light irradiation range having a circular shape inside the heat retaining light irradiation range.

7. The additive manufacturing device according to claim 1, wherein the heat retaining light irradiation range is longer on a rear side than on a front side in a moving direction of the melting light beam, with respect to the melting light irradiation range.

8. The additive manufacturing device according to claim 1, wherein when a molten pool is irradiated with the heat retaining light beam, the molten pool being formed by irradiating the substrate with the melting light beam to melt the powder material, the controller is configured to control the power density of the heat retaining light beam representing an output per unit area such that a cooling rate in the molten pool representing a temperature drop per unit time is 540° C./s or less at a freezing point of the cemented carbide binder included in the molten pool.

9. The additive manufacturing device according to claim 8, wherein the controller is configured to change at least the power density of the heat retaining light beam based on a temperature of the powder material on the substrate.

10. The additive manufacturing device according to claim 8, wherein the heat retaining light beam is configured to heat the substrate to 600° C. or higher.

11. The additive manufacturing device according to claim 8, wherein the controller is configured to control at least the power density of the heat retaining light beam on a rear side in a moving direction of the melting light beam.

12. The additive manufacturing device according to claim 1, wherein the powder material supply device is configured to eject the powder material to supply the powder material onto the substrate, and is provided so as to be movable integrally with the melting light beam irradiation device.

13. The additive manufacturing device according to claim 1, wherein the controller is configured to control the movement of the heat retaining light beam radiated by the heat retaining light beam irradiation device so as to follow a trajectory of the movement of the melting light beam radiated by the melting light beam irradiation device.

14. The additive manufacturing device according to claim 1, wherein the heat retaining light beam irradiation device is configured to heat the substrate to retain a temperature of the substrate.

15. The additive manufacturing device according to claim 1, wherein a melting point of the hard material is higher than a melting point of the cemented carbide binder.

16. The additive manufacturing device according to claim 15, wherein the hard material is tungsten carbide.

17. The additive manufacturing device according to claim 1, wherein the cemented carbide binder is cobalt or nickel.

18. The additive manufacturing device according to claim 1, wherein the controller is further configured to
determine whether a bead height representing a height of the beads is stable when the bead height is greater than a predetermined minimum bead height and less than a predetermined maximum bead height based on the image data,
when the bead height is greater than or equal to the predetermined maximum bead height, control the powder material supply device to reduce a supply amount of the powder material, and
when the bead height is less than the predetermined minimum bead height, control the powder material supply device to increase a supply amount of the powder material.

19. The additive manufacturing device according to claim 2, wherein the controller is configured to control the posture of the heat retaining light beam irradiation device to reduce an inclination angle of the heat retaining light beam with respect to the irradiation direction of the melting light beam to reduce the heat retaining light irradiation range, and the controller is configured to control the posture of the heat retaining light beam irradiation device to increase the inclination angle of the heat retaining light beam with respect to the irradiation direction of the melting light beam to increase the heat retaining light irradiation range.

20. An additive manufacturing device comprising:
   a powder material supply device including an ejection nozzle to supply a powder material from the ejection nozzle to a substrate, the powder material including a hard material and a cemented carbide binder;
   a melting light beam irradiation device including a melting light beam generator to radiate a melting light beam from the melting light beam generator, the melting light beam heating the powder material supplied to the substrate to a temperature equal to or higher than a melting point of the powder material to melt the powder material;
   a heat retaining light beam irradiation device including a heat retaining light beam generator to radiate a heat retaining light beam from the heat retaining light beam generator, the heat retaining light beam heating the powder material to a temperature lower than the melting point to retain the temperature in an outer side of a melting light irradiation range that is an irradiation range irradiated with the melting light beam;
   a first motor configured to rotate so as to rotate a substrate around a horizontal central axis, and a second motor configured to rotate so as to move the substrate in a direction of the horizontal central axis; and
   a controller configured to independently control each of the melting light beam irradiation device and the heat retaining light beam irradiation device, with respect to an irradiation of the melting light beam and the heat retaining light beam, and a relative movement of the melting light beam and the heat retaining light beam to the substrate,
   wherein the melting light beam irradiation device and the heat retaining light beam irradiation device are disposed such that the heat retaining light beam is inclined with the melting light beam,
   wherein the controller is configured to control rotation of the first motor and rotation of the second motor so as to control relative movement of the melting light beam and heat retaining light beam with respect to a circumferential surface of the substrate, and
   wherein the controller is further configured to:
      control a relative posture of the heat retaining light beam irradiation device to the melting light beam irradiation device, in a state where a heat retaining light irradiation range is overlapped with the melting light irradiation range, and
      control the posture of the heat retaining light beam irradiation device to radiate the heat retaining light beam toward at least rear side of a front side and a rear side of a molten pool in a moving direction of the heat retaining light beam.

* * * * *